(12) United States Patent
Leitner et al.

(10) Patent No.: US 7,506,910 B2
(45) Date of Patent: Mar. 24, 2009

(54) VEHICLE SEAT ASSEMBLY

(75) Inventors: Horst Leitner, Laguna Beach, CA (US); Bernard Leitner, Irvine, CA (US)

(73) Assignee: 89908, Inc., Irvine, CA (US)

( * ) Notice: Subject to any disclaimer, the term of this patent is extended or adjusted under 35 U.S.C. 154(b) by 253 days.

(21) Appl. No.: 11/498,304

(22) Filed: Aug. 1, 2006

(65) Prior Publication Data

US 2007/0085367 A1    Apr. 19, 2007

Related U.S. Application Data

(60) Provisional application No. 60/704,368, filed on Aug. 1, 2005.

(51) Int. Cl.
*B60N 2/02* (2006.01)
(52) U.S. Cl. ..................... 296/68; 296/65.01
(58) Field of Classification Search .............. 296/65.01, 296/65.09, 68
See application file for complete search history.

(56) References Cited

U.S. PATENT DOCUMENTS

| 3,013,837 | A |   | 12/1961 | Pessl et al. |
| 3,253,856 | A | * | 5/1966  | Ueda ........................... 296/68 |
| 4,802,706 | A | * | 2/1989  | Onimaru et al. ............... 296/68 |
| 5,474,353 | A | * | 12/1995 | Koester et al. ................ 296/68 |
| 5,636,884 | A |   | 6/1997  | Ladetto et al. |
| 6,158,811 | A |   | 12/2000 | Hofschulte et al. |
| 6,168,234 | B1 |  | 1/2001  | Haynes et al. |
| 6,755,469 | B2 |  | 6/2004  | Akaike et al. |
| 2002/0135214 | A1 | | 9/2002 | Ursel et al. |
| 2003/0075963 | A1 | | 4/2003 | Oberbeck |

FOREIGN PATENT DOCUMENTS

| GB | 563 578 A | 8/1944 |
| GB | 2 313 214 A | 11/1997 |
| WO | WO 89/06198 | 7/1989 |
| WO | WO 01/02213 | 1/2001 |

* cited by examiner

*Primary Examiner*—Lori L Lyjak
(74) *Attorney, Agent, or Firm*—Knobbe Martens Olson & Bear LLP

(57) ABSTRACT

A vehicle seat assembly that elevates and rotates to enhance passenger seat access is disclosed. The vehicle seat assembly includes a seat and a plurality of links pivotally coupled to a lower surface of the seat at one end of each of the links and pivotally mounted with respect to a vehicle floor at the opposite end of each of the links. The axes of rotation of each link relative to the vehicle floor converge at a central area underneath the seat. A motor may be used to drive at least one link to actuate the seat between a first position in which the links are substantially parallel to the vehicle floor and a second position in which the links are transverse to the vehicle floor. In moving from the first to the second position, the seat is elevated and rotated by the movement of the links.

23 Claims, 18 Drawing Sheets

VEHICLE SEAT ASSEMBLY

CROSS-REFERENCE TO RELATED APPLICATIONS

This application claims the benefit of U.S. Provisional Patent Application No. 60/704,368, entitled "VEHICLE SEAT ASSEMBLY," filed on Aug. 1, 2005.

Also, this application hereby incorporates by reference the above-identified provisional application, in its entirety.

FIELD OF THE INVENTION

The present invention relates generally to vehicle seats, and more specifically to vehicle seats which are movable.

DESCRIPTION OF THE ART

Seating surfaces in vehicles such as cars, boats, airplanes, and trains are often low relative to the floor of the vehicle. This low seat surface height requires a passenger (as used herein, a passenger of a vehicle includes any vehicle passenger and the driver, pilot, or captain of that vehicle) to physically strain themselves to sit down on or stand up from the seat. The physical demands of lowering oneself to a low seating surface can be exacerbated in the case of a vehicle such as a car, where a low seating surface may be combined with a low ceiling and a small or oddly-shaped door opening to require physical maneuvering bordering on contortion to access or exit the vehicle seat. Moreover, the physical difficulties in accessing vehicle seats are increased in higher performance sports cars and sports sedans as high performance cars often have lower ride heights and lower rooflines than more traditional sedans, trucks, and vans, allowing for a lower center of gravity and lower drag, both beneficial to overall vehicle performance. Moreover, performance cars often have two doors, which can make entry to and exit from these cars difficult in tight parking quarters as the doors can not be opened as widely as a shorter door on a four-door car. Therefore, there is a need for a vehicle seat that assists a passenger in entry and exit from the vehicle.

SUMMARY OF THE INVENTION

Previous vehicle seats have offered elevation adjustment to provide passenger adjustability while in a seated position, for example to allow a passenger to select a comfortable seating position or obtain a desirable view. However, these vehicle seats have generally not been configured be height-adjustable to promote vehicle entry and egress, and have not offered rotation capabilities. Merely elevating the passenger often will not aid access to the seat as a car passenger would then need to squeeze out of a shorter opening between the vehicle roofline and a now-elevated seat. Therefore, there is a need for a vehicle seat that rotates a passenger towards the vehicle door, while elevating the passenger to position the passenger for easy entry to or exit from the vehicle.

Prior vehicle seats have combined elevation and rotation functions of a vehicle seat to aid with loading and unloading of the seat. But, these seats have featured multiple, complex mechanisms to accommodate both the elevation and rotation of the seat, leading to increased costs, manufacturing complexities, and reliability concerns. Therefore, there is a need for a seat that elevates and rotates through the use of a simple, robust mechanism to provide enhanced access to a passenger seat.

In light of the shortcomings of the prior art as discussed above, there is a need for a vehicle seat assembly that elevates and rotates a passenger to enhance access to the vehicle's door and assist the passenger in entering or exiting the vehicle. In various embodiments, vehicle seat assemblies of the present invention provide a vehicle seat that rotates and elevates with respect to the floor of the vehicle to assist passenger ingress and egress.

In certain embodiments, the vehicle seat assembly includes a seat having a seating surface and a plurality of links, each link having a first portion and a second portion. The first portion of each link is configured to be pivotally mounted with respect to a floor of a vehicle. The second portion of each link is pivotally connected to a lower surface of the seating surface. The pivotal mounting of the first ends of each link defines an axis of rotation for each link. The axes of rotation of every link of the plurality of links intersect at a central area beneath the seat when the seat is in a relaxed position. Typically, the first portion is the first end and the second portion being the second end, though this is not necessary. As used herein, "end" is a broad term and is not limited to the outer most portion of the link.

In other embodiments, the vehicle seat assembly includes a seat having a seating surface and a plurality of links, each link having a first portion and a second portion. The first portion of each link is configured to be pivotally mounted with respect to a floor of a vehicle. The second portion of each link is pivotally coupled to a lower surface of the seating surface. The pivotal mounting of each link defines a pair of axes of rotation for each link. The seat assembly is movable between a first position in which the axes of rotation for each of the plurality of links are substantially parallel to the floor of the vehicle and the seating surface and a second position in which the plurality of links are transverse to the vehicle floor and the seating surface. When the seating assembly is moved between the first and second positions, the links cooperate to elevate and rotate the seat with respect to the vehicle floor.

In other embodiments, the vehicle seat assembly includes a seat and a single rotating linkage mechanism. The single rotating linkage mechanism provides both elevation and rotation of the seat relative to a vehicle floor.

In still other embodiments, methods of elevating and rotating a vehicle seat are disclosed. The methods include the steps of providing a seat assembly having a seating surface pivotally mounted to a floor of a vehicle with a plurality of links and driving at least one of the plurality of links from a first position in which the at least one driven link is substantially parallel to the vehicle floor and the seating surface towards a second position in which the at least one driven link is transverse to the vehicle floor and the seating surface. Each link of the plurality of links has a first end and a second end. The first ends of each of the plurality links are pivotally mounted with respect to the floor of the vehicle and the second ends of each of the plurality of links are pivotally coupled to a lower surface of the seating surface.

In yet other embodiments, methods of exiting a seat assembly are disclosed. The methods include the steps of actuating a seat assembly comprising a seat having a seating surface and standing up off of the seat. The seat is pivotally mounted with respect to a floor of a vehicle with a plurality of links each having a first end and a second end. The first ends of each of the plurality of links are pivotally mounted with respect to the floor of the vehicle and the second ends of each of the plurality of links are pivotally coupled to a lower surface of the seating surface. The actuating step includes the step of moving the plurality of links from a first position in which the links are substantially parallel to the vehicle floor toward a second position in which the links are transverse to the vehicle floor and the seating surface.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENT

Three Link Seat Assemblies

Figure 1A:
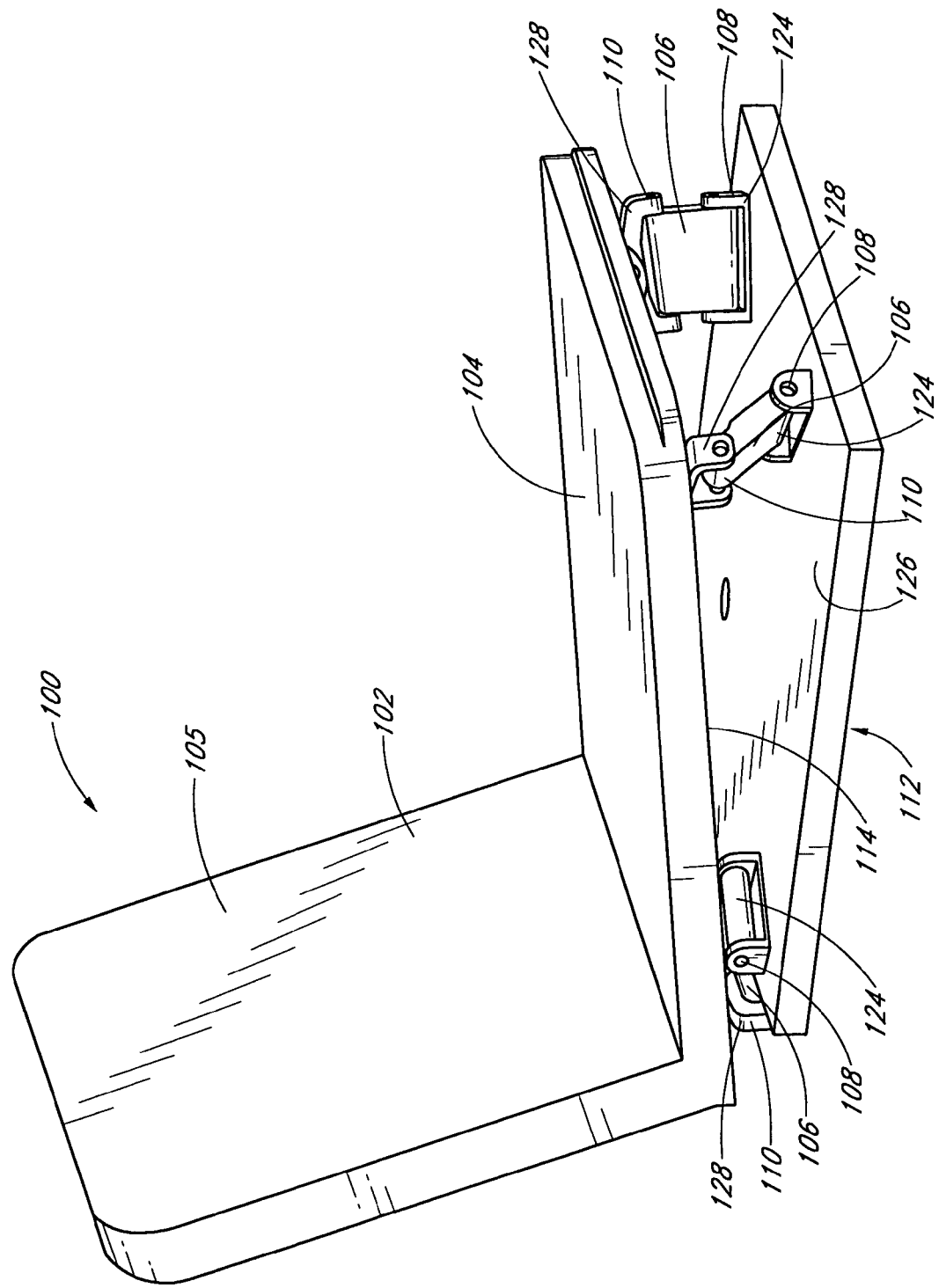
FIG. 1A is a perspective view of one embodiment of a vehicle seat assembly in a partially elevated position.

In certain embodiments of the present invention, a vehicle seat assembly having three pivotable links is disclosed. Specifically, with reference to FIGS. 1-7, various aspects of a three-link vehicle seat assembly are illustrated. FIG. 1 depicts a perspective view of a three link vehicle seat assembly of the present invention. The vehicle seat assembly 100 comprises a seat 102 having a seating surface 104; and a plurality of links 106, each link having a first portion desirably defining first end 108 and a second portion desirably defining a second end 110. In the embodiments of FIGS. 1-7, a three-link seat assembly is illustrated, although it is recognized that seat assemblies having four or more links are also within the scope of the present invention.

The seat 102 may be a standard vehicle seat, such as a car seat, a boat seat, an airplane seat, or a train seat, having a seating surface 104. Preferably, the seat 102 is a car seat having a seating surface 104 and a back rest surface 105. In a multiseat vehicle such as a passenger car, a vehicle seat assembly 100 as disclosed herein may be used for one, some, or all of the seat locations. The seating surface 104 has a lower surface 114 that may be configured to be directly or indirectly pivotally coupled or connected with the second ends 110 of each link 106 as further described below.

Each of the plurality of links 106 is desirably comprised of a substantially rigid material and, together, the plurality of links 106 is capable of supporting the weight of the seat 102 and a vehicle passenger. The links may be comprised of, for example, a metal, plastic, composite, or other material having similar rigidity and strength properties. In the disclosed embodiment, the links are substantially thin and planar, so as to be compact and facilitate packaging.

The first end 108 of each link is configured to be directly or indirectly pivotally mounted or connected with respect to a floor of a vehicle 112. This pivotal mounting may be made through the use of a coupling known in the art to allow pivotal movement of the link 106 with respect to the vehicle floor 112, but preferably a pin-based hinge 124 is used to provide pivotal mounting. The first end 108 of each link 106 may be pivotally coupled directly to the vehicle floor 112. Alternately, to provide additional adjustability of the vehicle seat 102, the first end 108 of each link 106 may be attached to a base section 126 that is configured to mount to the floor of a vehicle. This base section 126 may be configured to mount to the vehicle floor 112 as known in the art. For example, the base section 126 may be slidably attached to the vehicle floor 112 on at least one rail or seat track. Alternately, the base section 126 may be removably attached to the vehicle floor 112 such that the entire seat assembly 100 may be removed, for example, to allow additional room for cargo.

Figure 5:
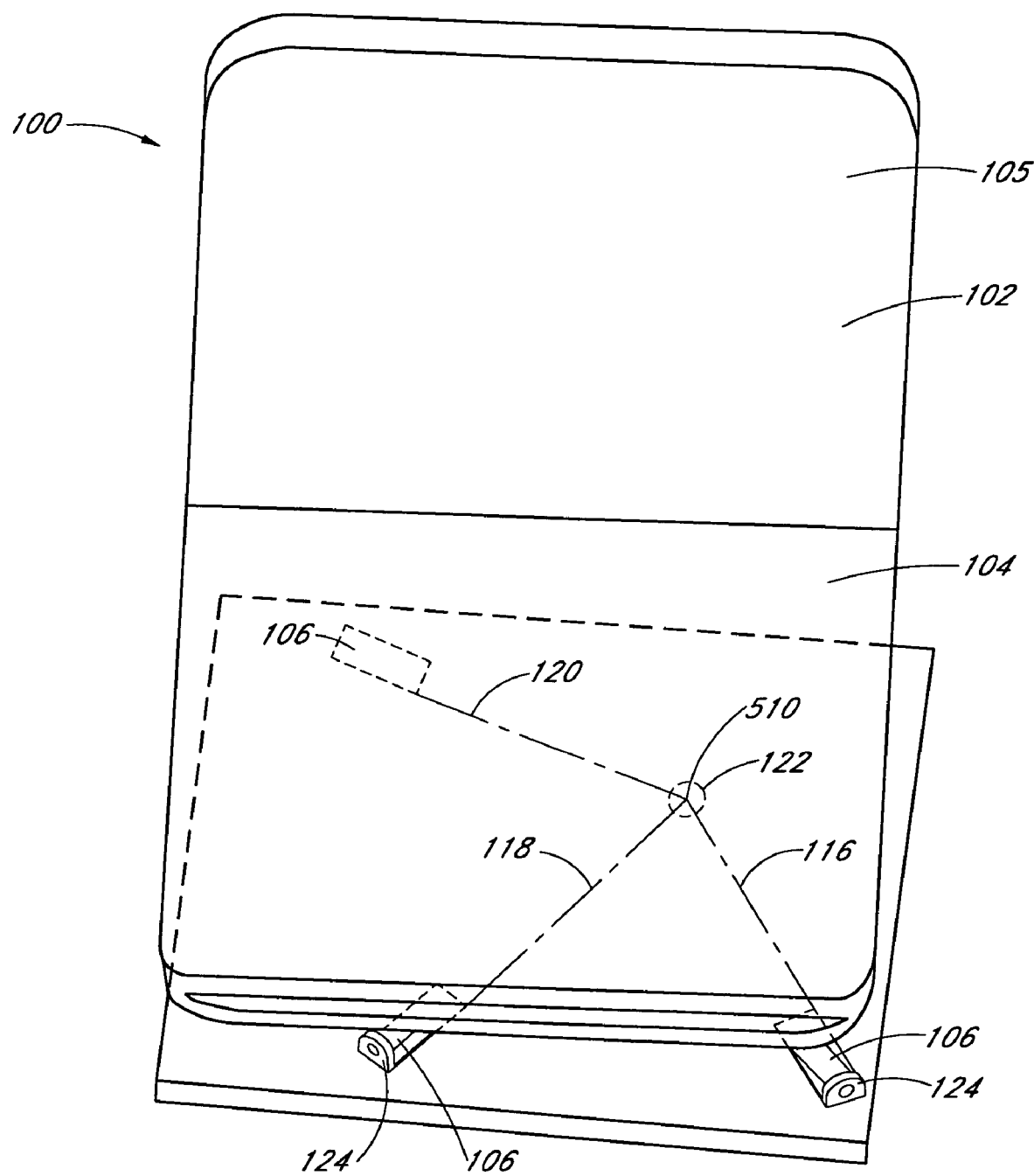
FIG. 5 is a top view of the vehicle seat assembly of FIG. 1A with a superimposed schematic view of axes of rotation for each of the links.
Figure 6:
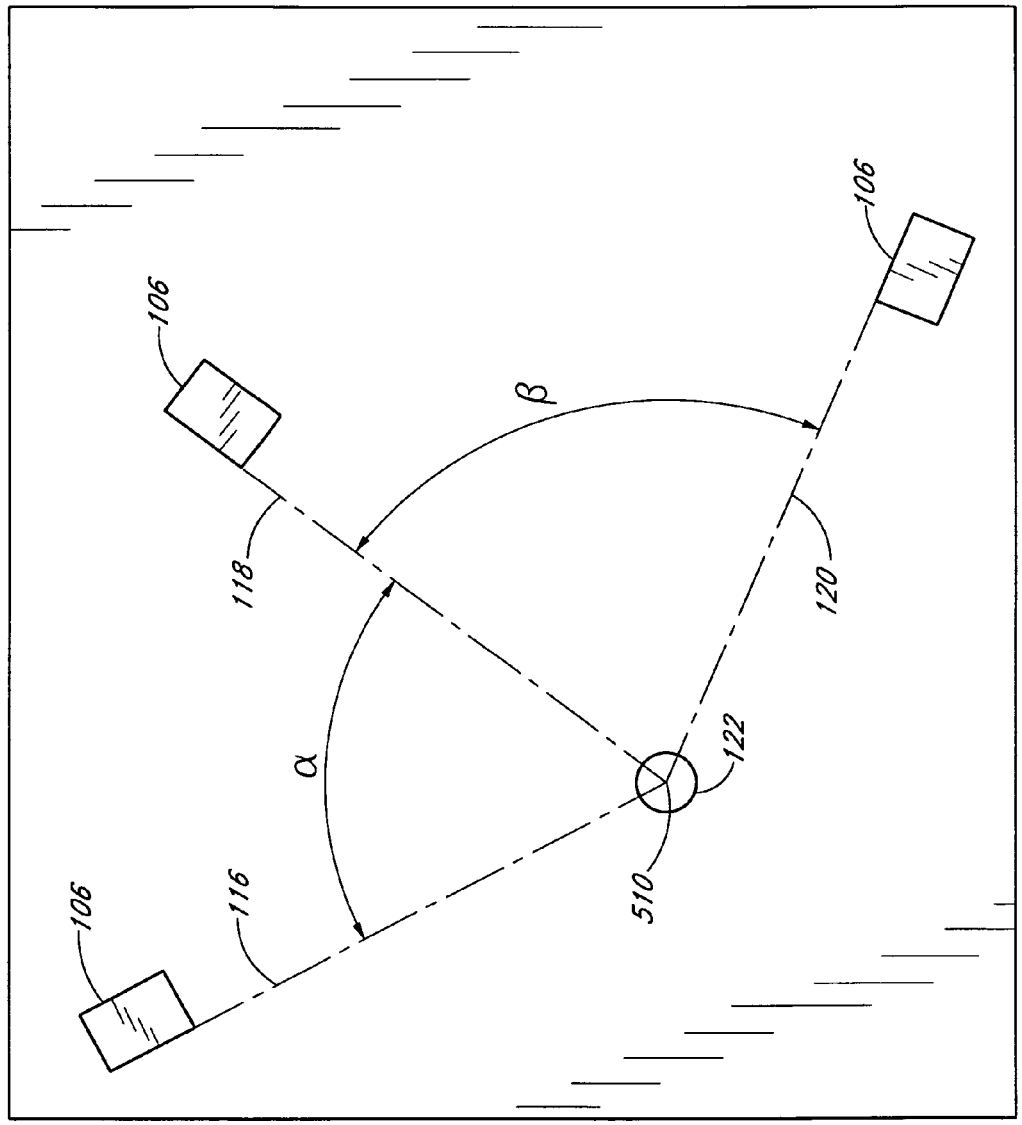
FIG. 6 is a schematic view of the axes of rotation of the links of a three-link embodiment of a vehicle seat assembly.

The pivotal mounting of the first ends 108 of each link 106 with respect to the floor of the vehicle 112 defines an axis of rotation 116, 118, 120 (FIGS. 5 and 6) for each link. FIG. 5 is a top view of a vehicle seat assembly 100 with a superimposed schematic view of the axes of rotation 116, 118, 120 of the links 106. FIG. 6 is a schematic view of the axes of rotation 116, 118, 120 of the links 106. The axes of rotation 116, 118, 120 of each link 106 intersect at a central area 122 beneath the seat 102. Desirably, the central area has an area of approximately 64 square inches such as the area defined by a generally square shape having a side length of 8 inches. More desirably, the central area has an area of approximately 4 square inches, such as the area defined by a generally square shape having a side length of 2 inches. Preferably, the axes of rotation intersect at substantially a single point 510 beneath the seat 102. This intersection of the axes of rotation 116, 118, 120 facilitates smooth elevation and rotation of the seat 102 relative to the vehicle floor 112 by pivoting the links 106 about their respective axes 116, 118, 120. Thus, advantageously, both elevation and rotation of the seat 102 is accomplished through the three link assembly rather than the complex separate elevation and rotation mechanisms of the prior art. Advantageously, this single mechanism provides coordinated elevation, and rotation of the seat results in smooth, reliable, easy-to-use actuation of the seat to enhance passenger access.

Figure 1B:
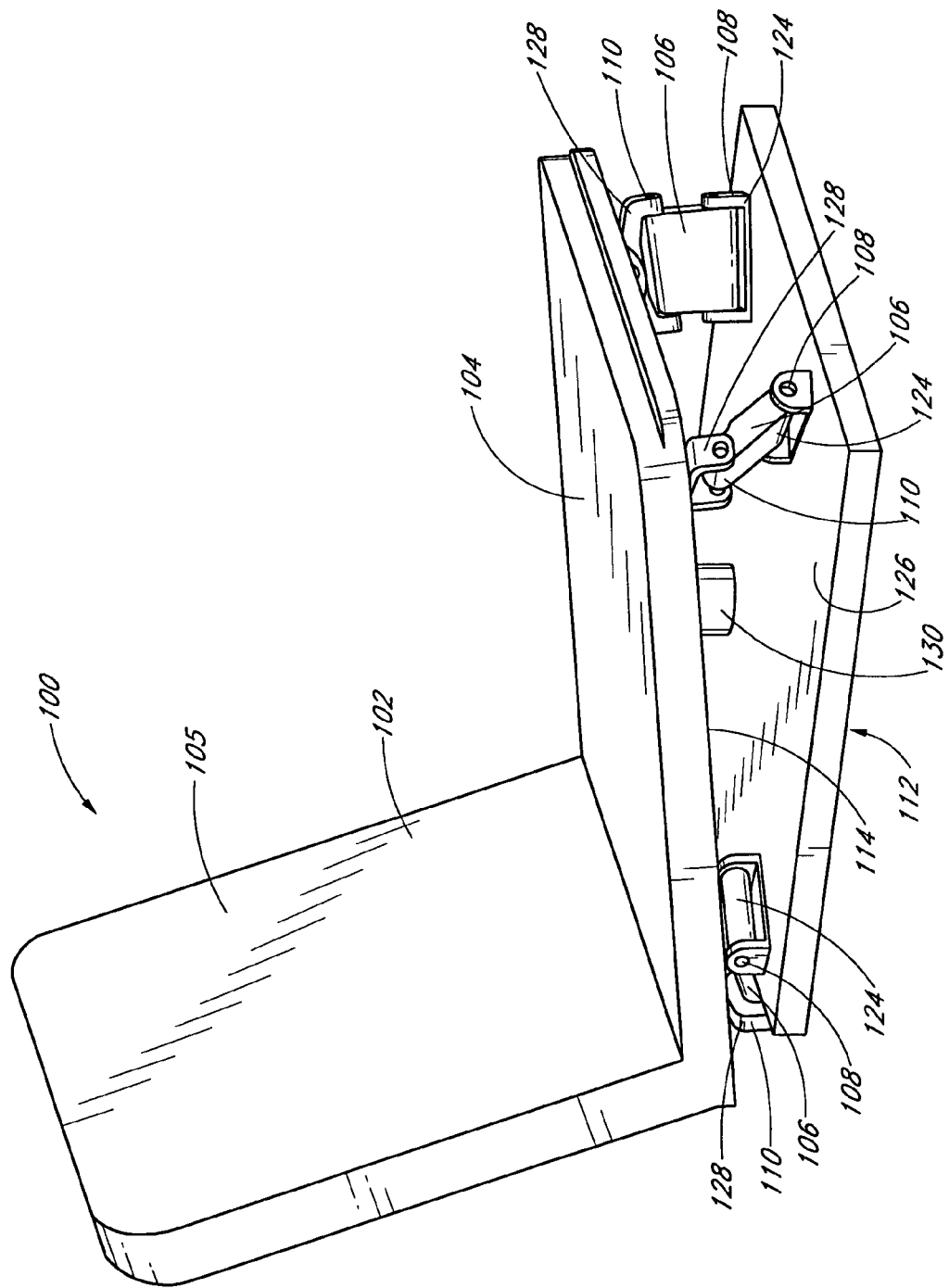
FIG. 1B is a perspective view of another embodiment of a vehicle seat assembly having a telescoping multiaxial joint in a partially elevated position.
Figure 2A:
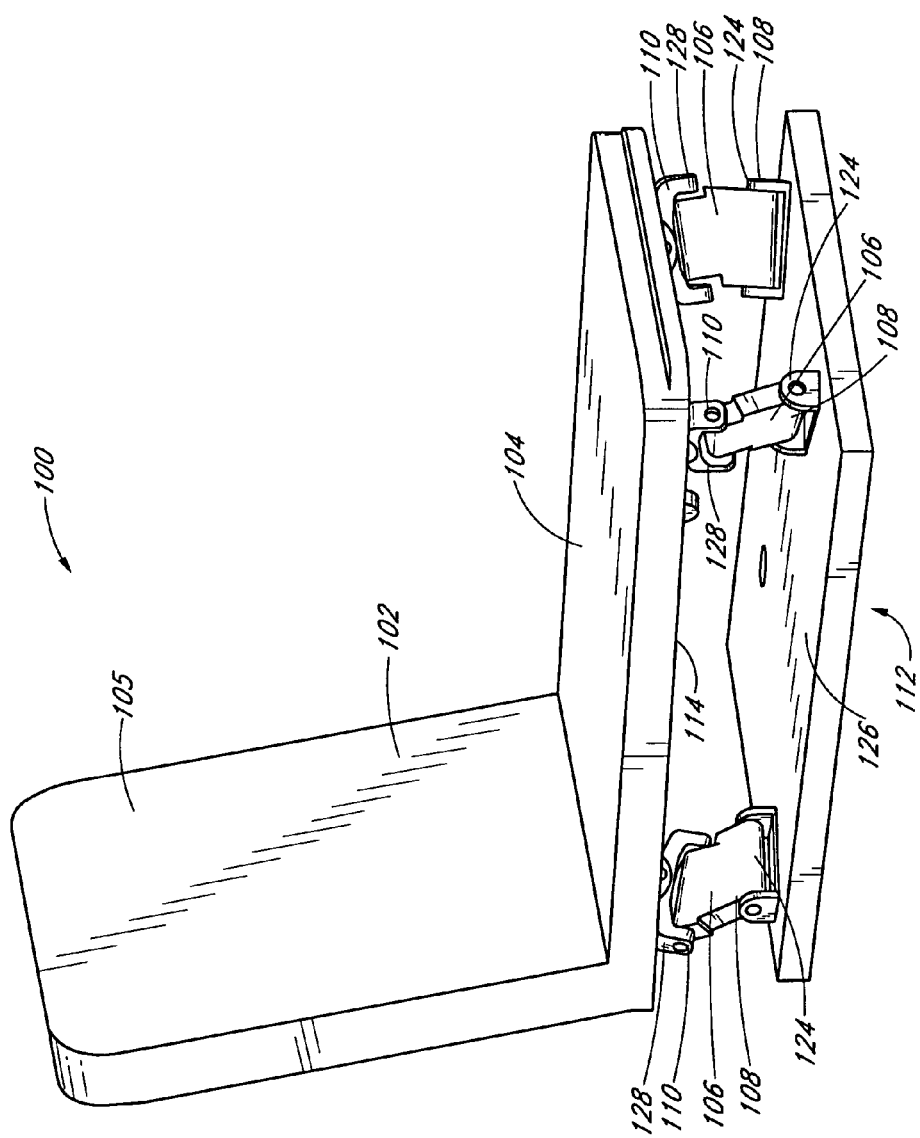
FIG. 2A is a perspective view of the vehicle seat assembly of FIG. 1 in an elevated and rotated position.
Figure 2B:
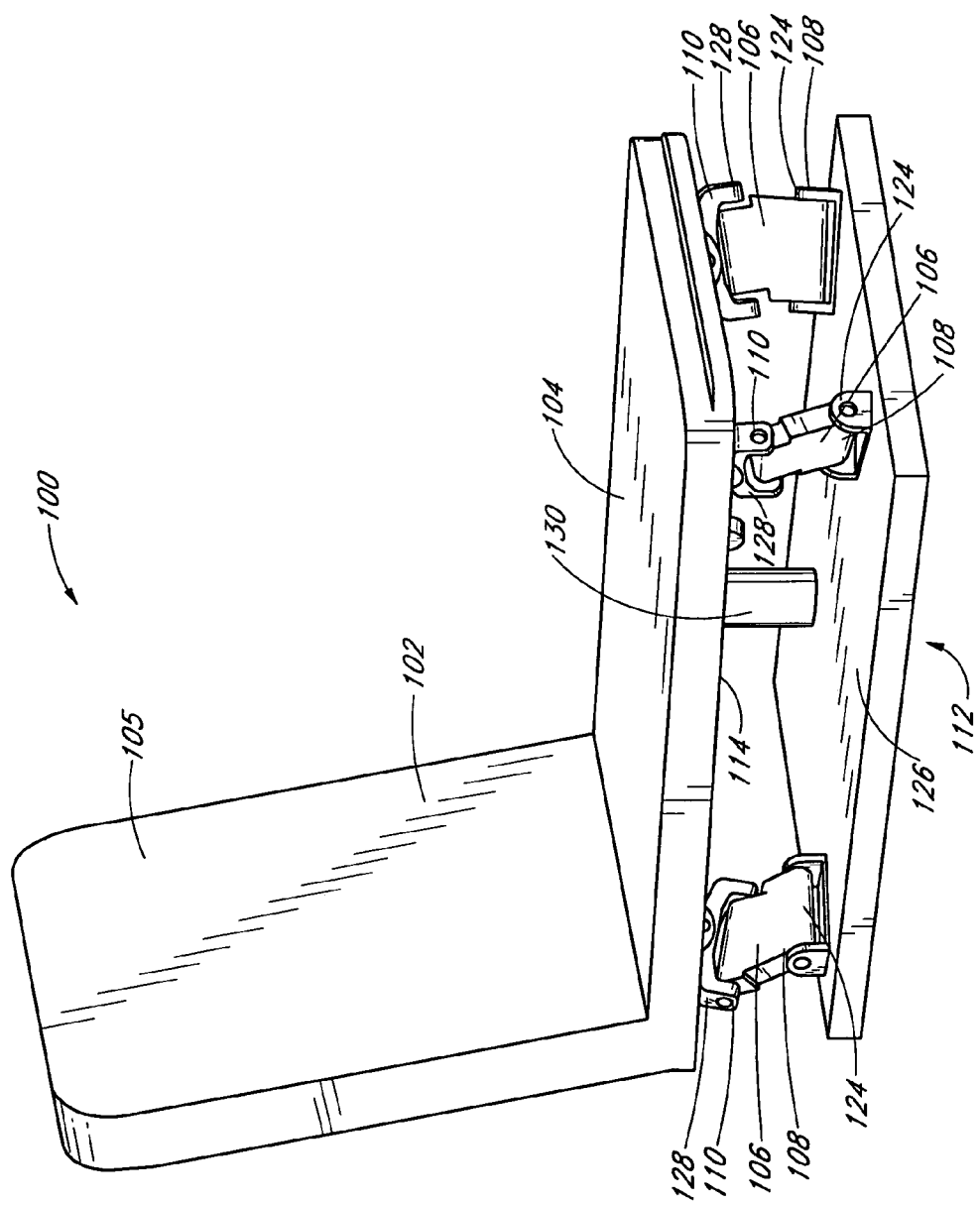
FIG. 2B is a perspective view of the vehicle seat assembly of FIG. 1B in an elevated and rotated position.
Figure 3:
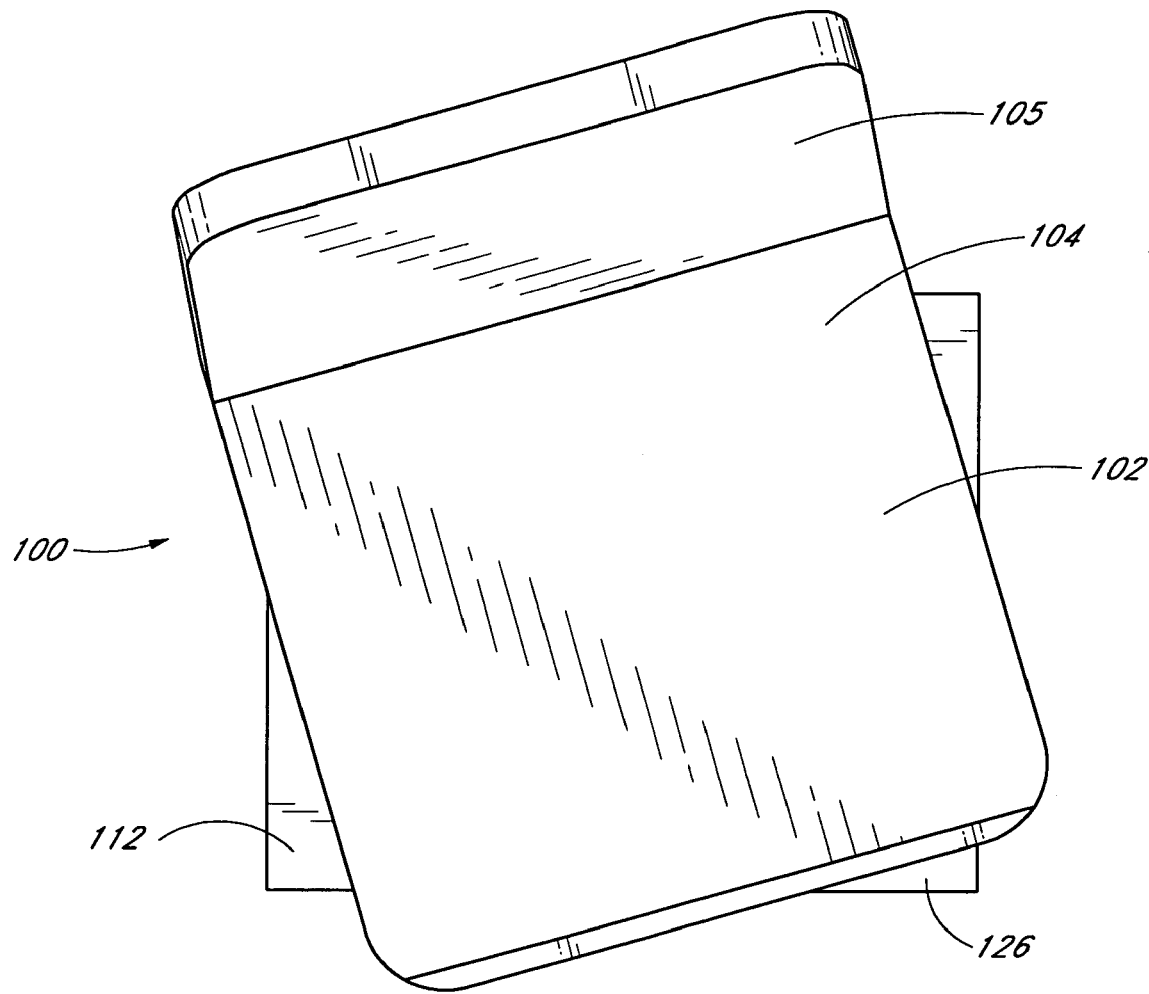
FIG. 3 is a top view of the vehicle seat assembly of FIG. 1A in an elevated and rotated position.

With reference to FIGS. 1B and 2B, in some embodiments, the vehicle seat assembly can include a telescoping ball joint 130 positioned approximately at the central area 122 of the seat. In FIGS. 1B and 2B, the telescoping ball joint 130 is illustrated schematically as it is contemplated that various ball joints can be used in the seat assembly. Advantageously, the telescoping ball joint 130 can move with and support the vehicle seat 102 over the range of motion of the seating surface 104 during actuation of the mechanism. Thus, loads on the links 106 can be reduced by the ball joint 130. Moreover, in embodiments of vehicle seat assembly including a ball joint 130, there can be additional tolerance for minor misalignments of the links 106.

Figure 7:
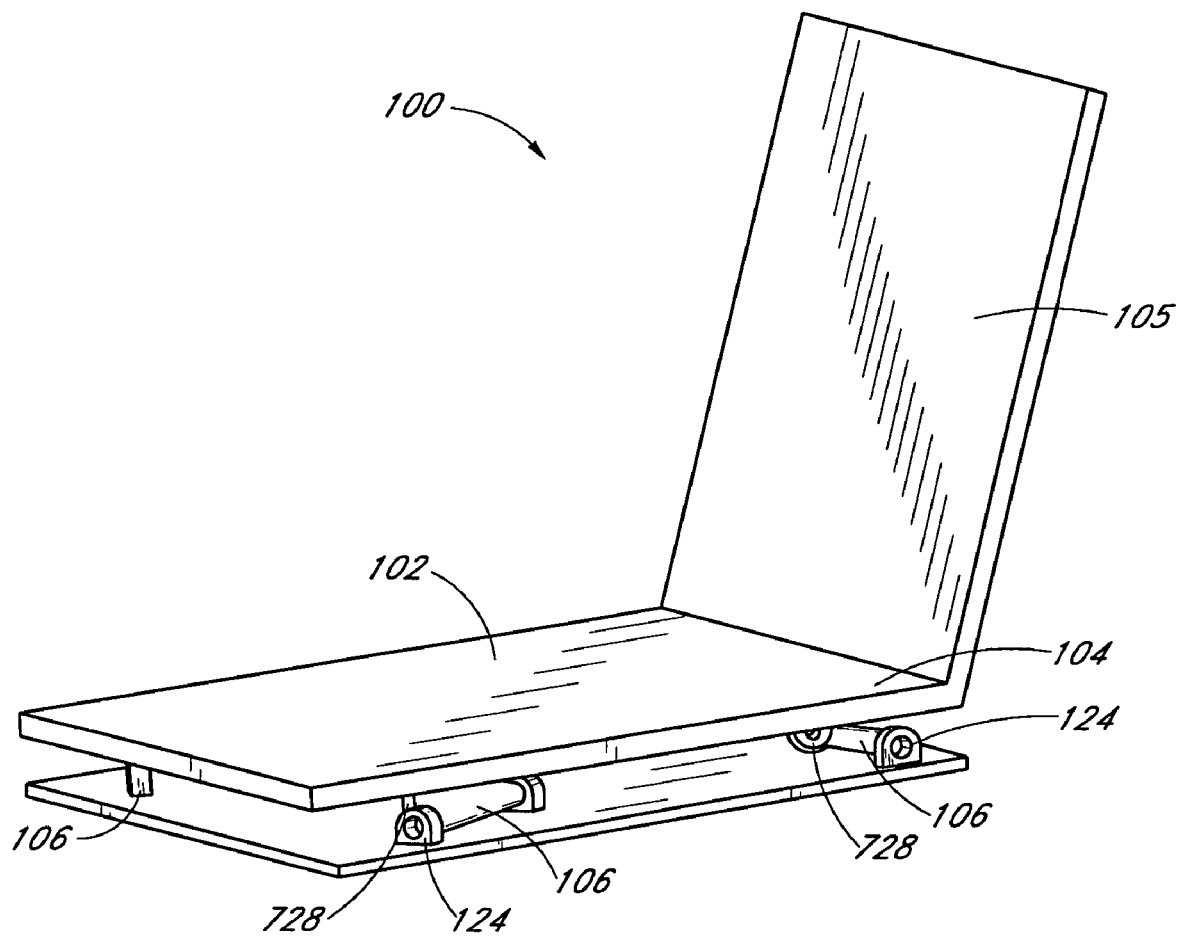
FIG. 7 is a perspective view of an alternate embodiment of a three link vehicle seat assembly.

The second end 110 of each link 106 is pivotally coupled to a lower surface 114 of the seating surface 104. This pivotal coupling of the second end 110 may be accomplished with a coupling known in the art to allow relative rotation each of the links 106 and the seating surface about two transverse axes. For example, the pivotal coupling may be provided for each link 106 by a double hinge assembly 128. Alternately, the pivotal coupling may be provided by a spherical bearing 728 (FIG. 7) pivotally coupling each link 106 to the seating surface 104. FIG. 7 depicts a perspective view of a three-link embodiment of a seat assembly 100 having spherical bearings 728 pivotally coupling the links 106 to the lower surface 114 of the seating surface 104.

The elevation and rotation of the vehicle seat assembly is depicted in FIGS. 1-4. The seat assembly 100 is movable between a first position in which the links 106 are substantially parallel to the vehicle floor 112 and the seating surface 104 and a second position in which the links 106 are transverse to the floor of the vehicle 112 and the seating surface 104. During typical operation of a vehicle such as driving a car, the seat 100 will remain in the first position. The seat may be moved part way between the first and second position during operation of the vehicle to adjust the elevation and rotation of the seat relative to the vehicle to enhance the view or the comfort of the passenger. The seat 100 may be moved to the second position to facilitate entering or exiting the vehicle. When the seat assembly 100 is moved between the first and second positions, the seat 102 is elevated and rotated with respect to the vehicle floor 112 to enhance passenger access and facilitate passenger egress.

FIGS. 1 (perspective view) and 4 (top view) depict the seat assembly 100 in a partially elevated position, having left the first position, and moving towards the second position. FIGS. 2 (perspective view) and 3 (top view) depict the seat assembly 100 in an elevated and rotated position closer to the second position. Preferably, the links 106 are arranged such that in moving from the first position to the second position, the seat 102 elevates a passenger and rotates the legs of the passenger towards a vehicle door such as a car door to ease exit from the seat 102. Likewise, the vehicle seat 102 may be used to ease sitting down on a vehicle seat by allowing a passenger to sit down on the seat in the second position, then moving the vehicle seat from the second position to the first position.

Figure 4A:
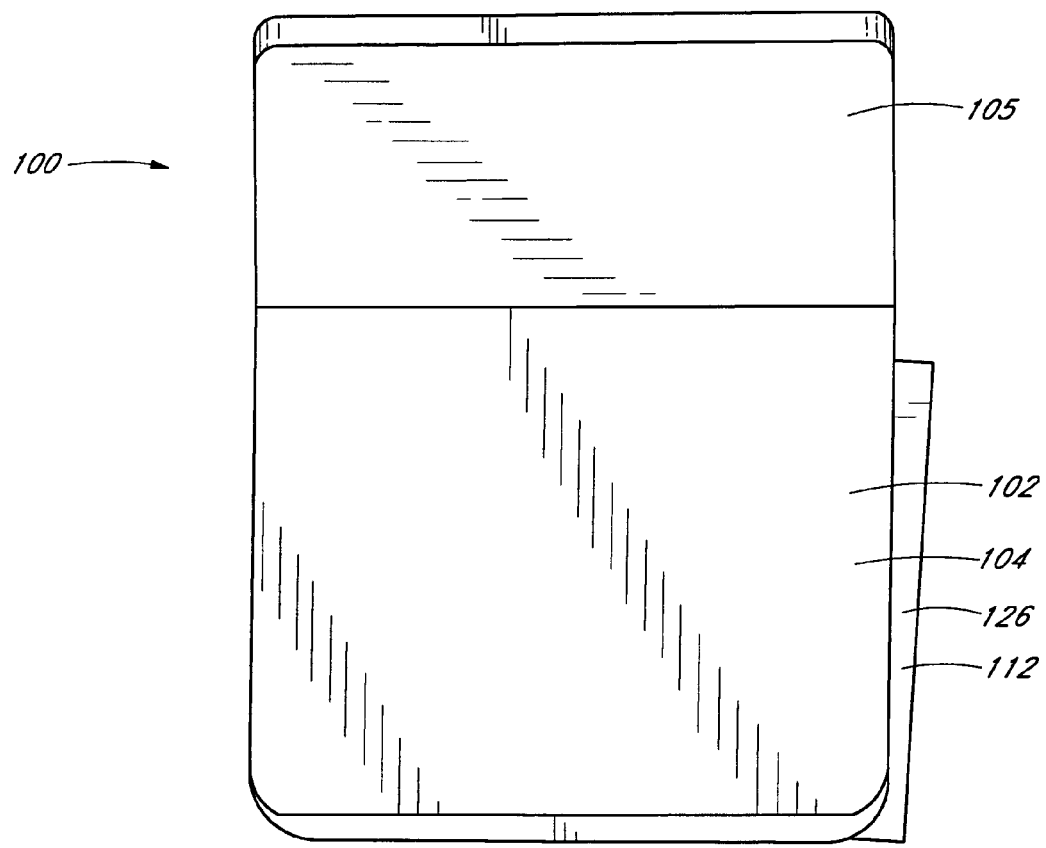
FIG. 4A is a top view of the vehicle seat assembly of FIG. 1A in a partially elevated position.
Figure 4B:
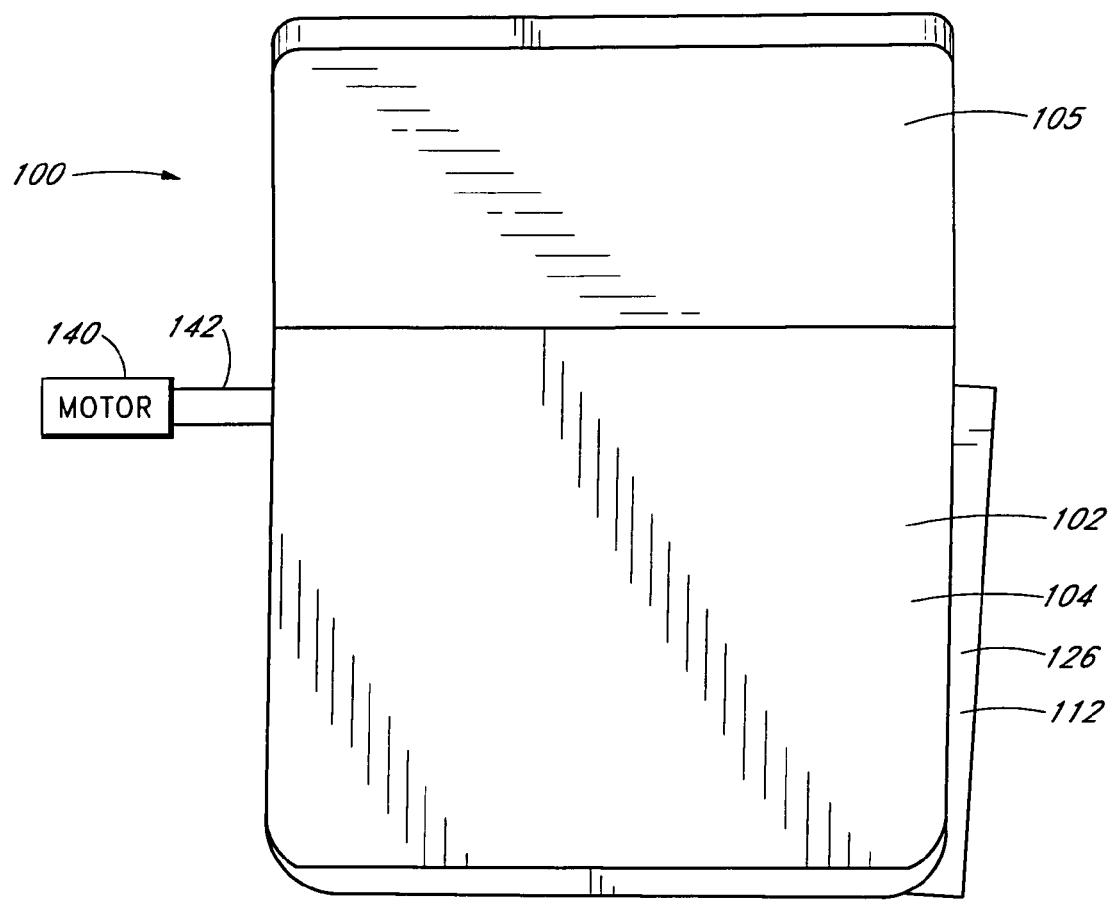
FIG. 4B is a top view of the vehicle seat assembly of FIG. 1A in a partially elevated position including a schematic diagram of an attached electric motor.

To assist with passenger ingress and egress of the vehicle, the seat assembly 100 may be driven between the first position and the second position by a motor 140 (FIG. 4B) driving the pivotal rotation of one of the links 106. The motor 140 may be an electric motor or a hydraulic actuator coupled to one of the links 106 via an output shaft 142 (FIG. 4B). FIG. 4B illustrates a schematic representation of a motor 140 and output shaft 142 with the seat assembly 100. The passenger may control the motor using a door or dashboard-mounted switch, button, dial, or other suitable control. In three link embodiments of the seat assembly 100, a single motor 140 coupled to a single link 106 can be used to move the seat between the first position and the second position. Alternately, in other three-link embodiments, more two or more motors coupled to one, two, or more links can be used to move the seat between the first position and the second position. However, in four or more link embodiments of the seat assembly 800, discussed below and depicted in FIGS. 8-11, two or more motors 840, 842 (FIG. 10B) acting on two or more links 806 may be required.

Four Link Seat Assemblies

Figure 8:
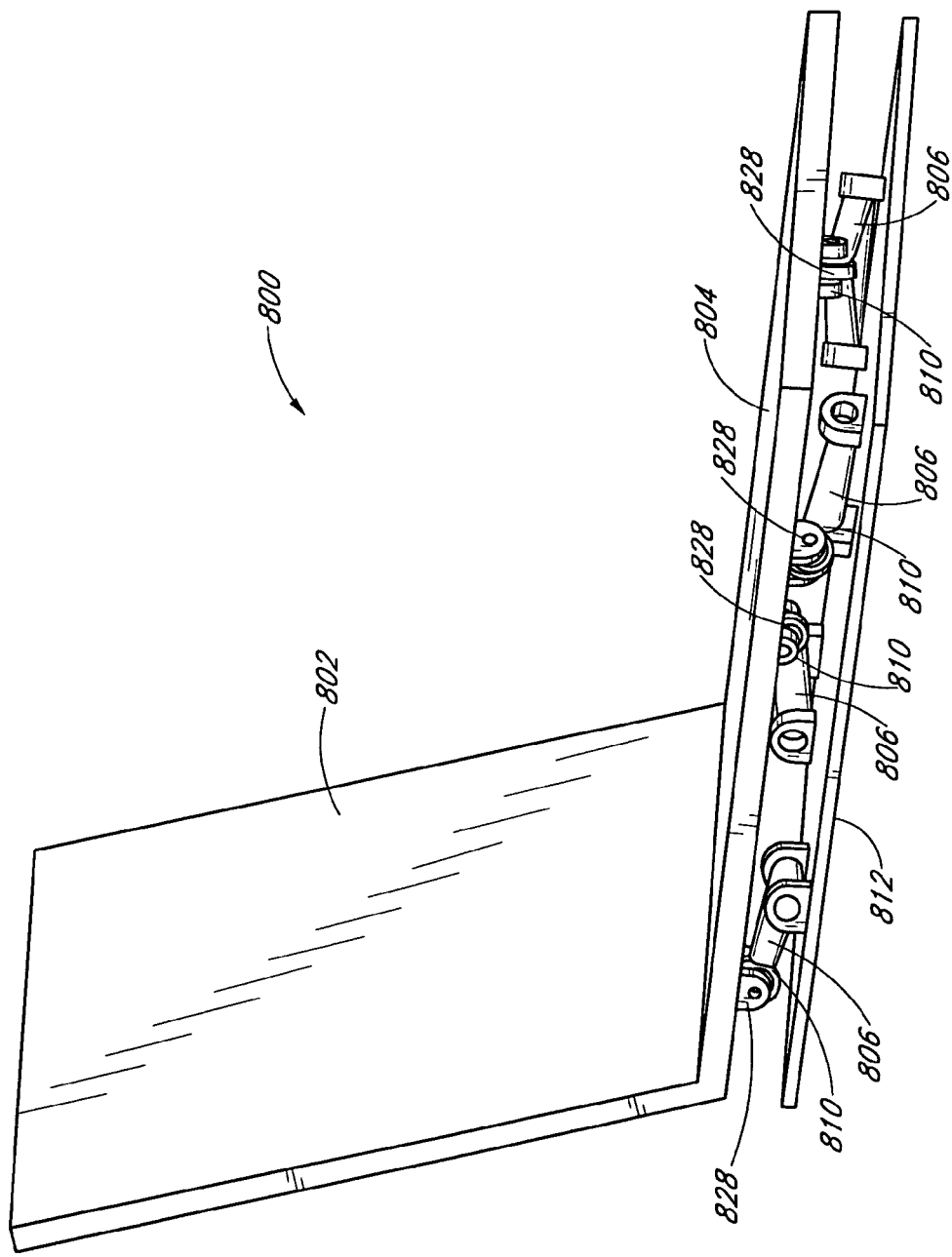
FIG. 8 is a perspective view of four link embodiment of a vehicle seat assembly in a lowered position.
Figure 9:
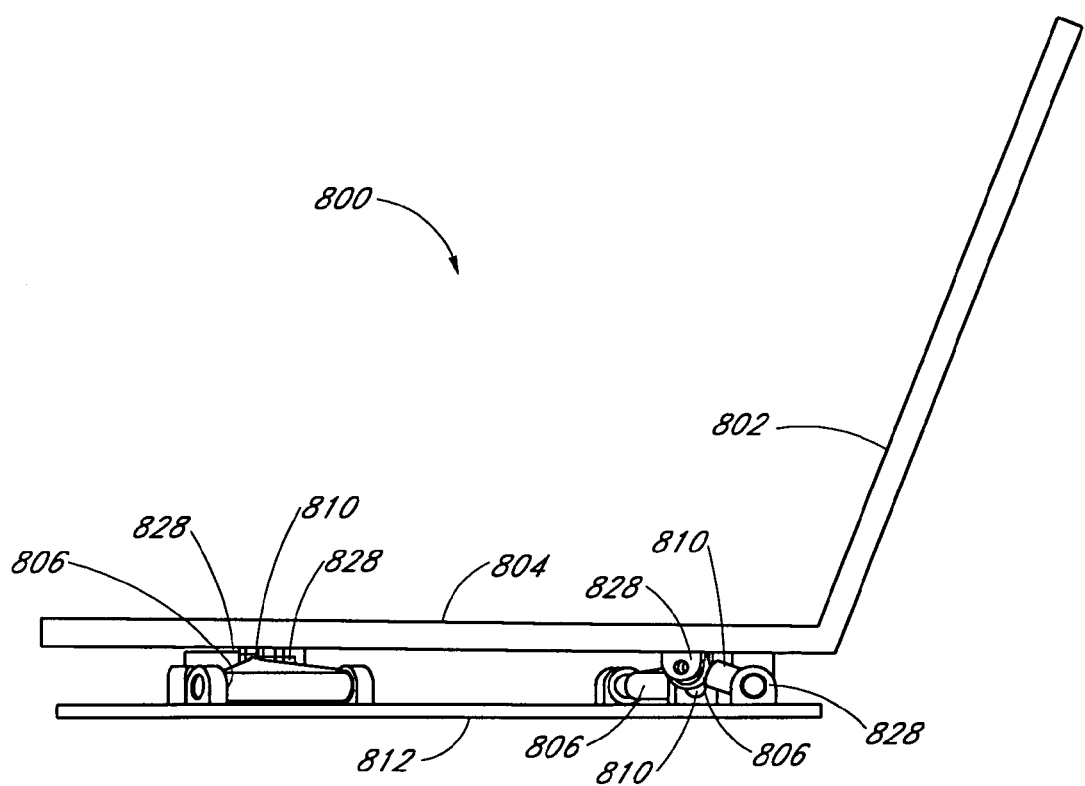
FIG. 9 is a side view of the vehicle seat assembly of FIG. 8.
Figure 10A:
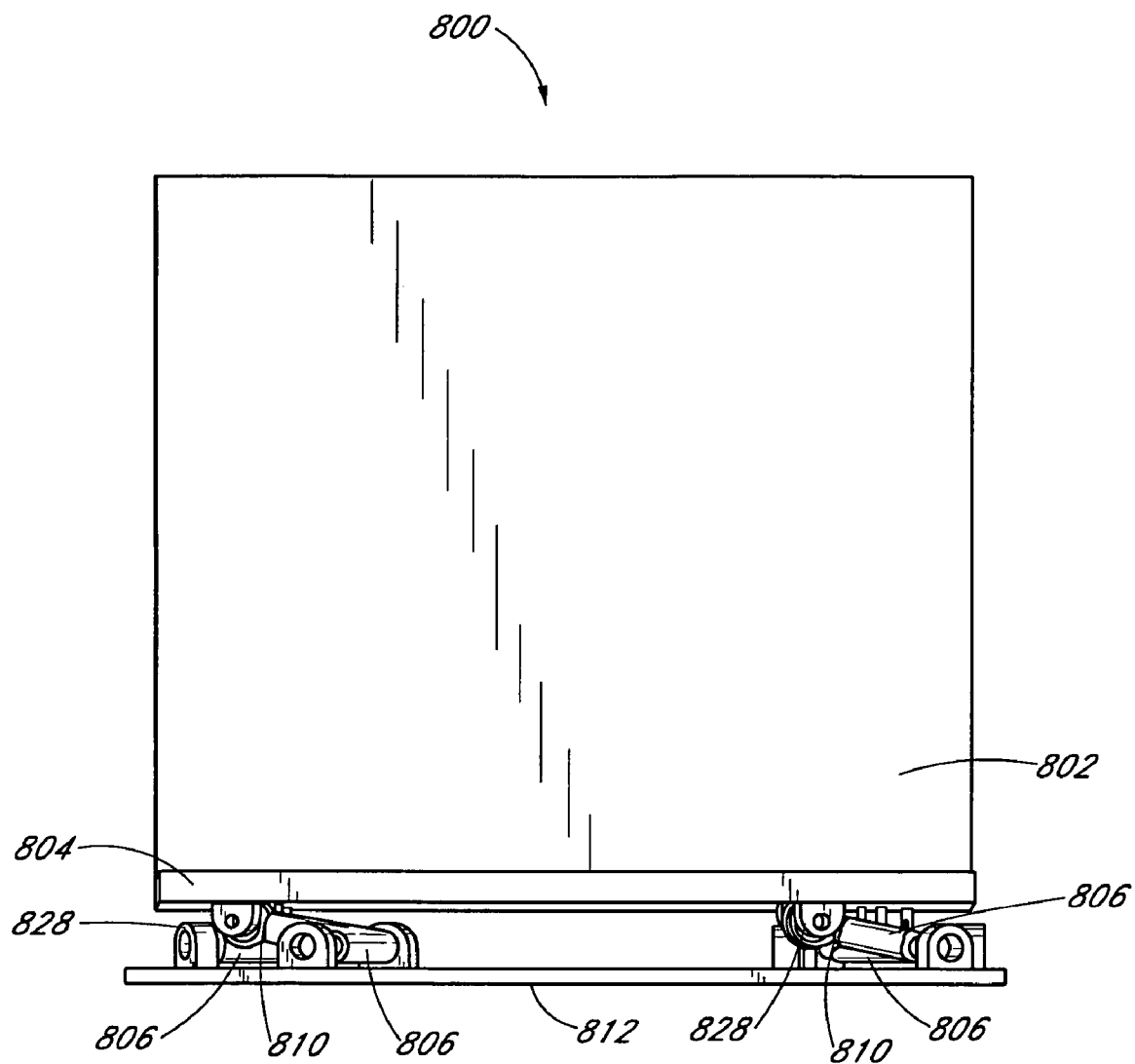
FIG. 10A is a front view of the vehicle seat assembly of FIG. 8.
Figure 10B:
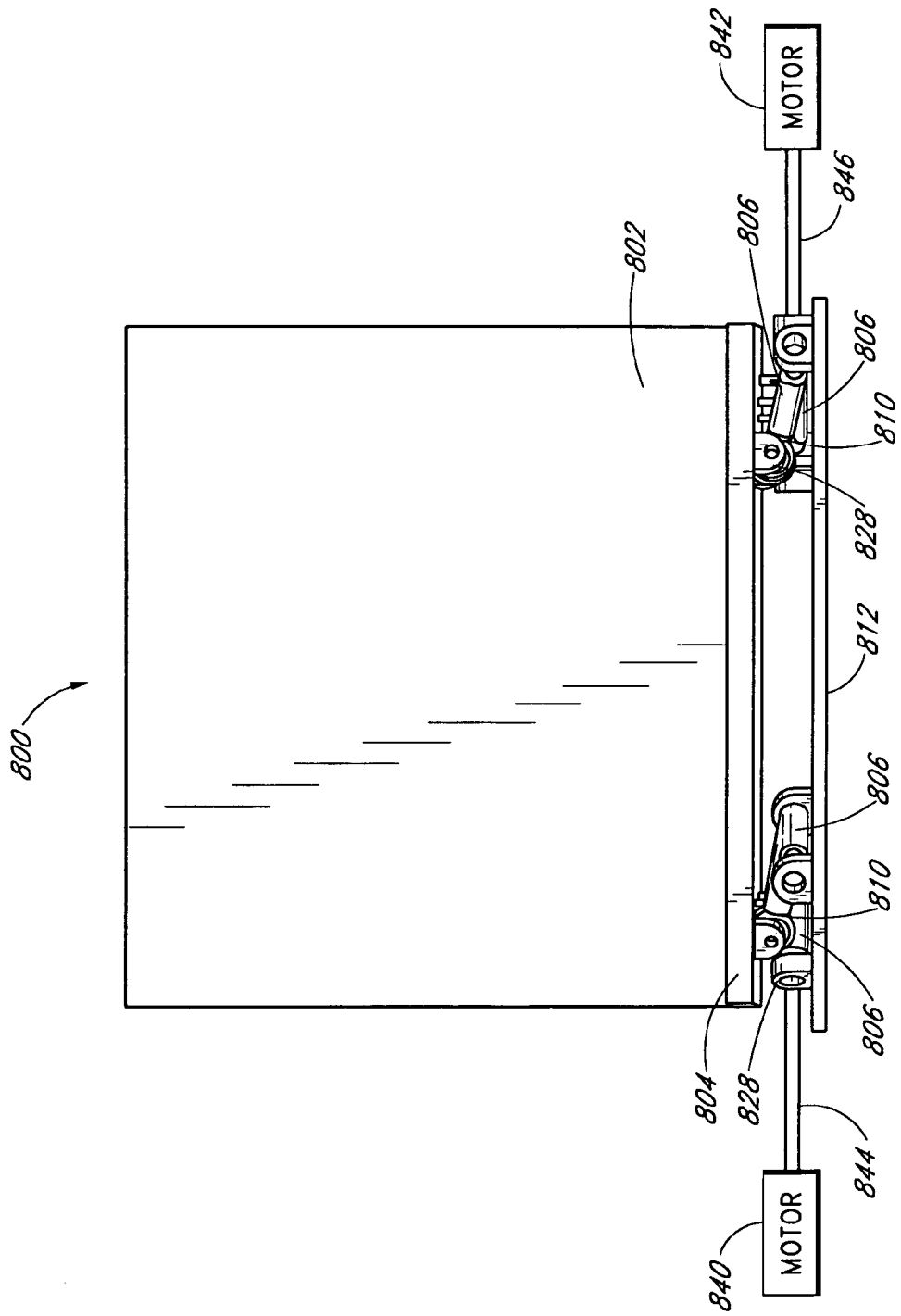
FIG. 10B is a front view of the vehicle seat assembly of FIG. 8 with a schematic diagram of two attached electric motors.
Figure 11A:
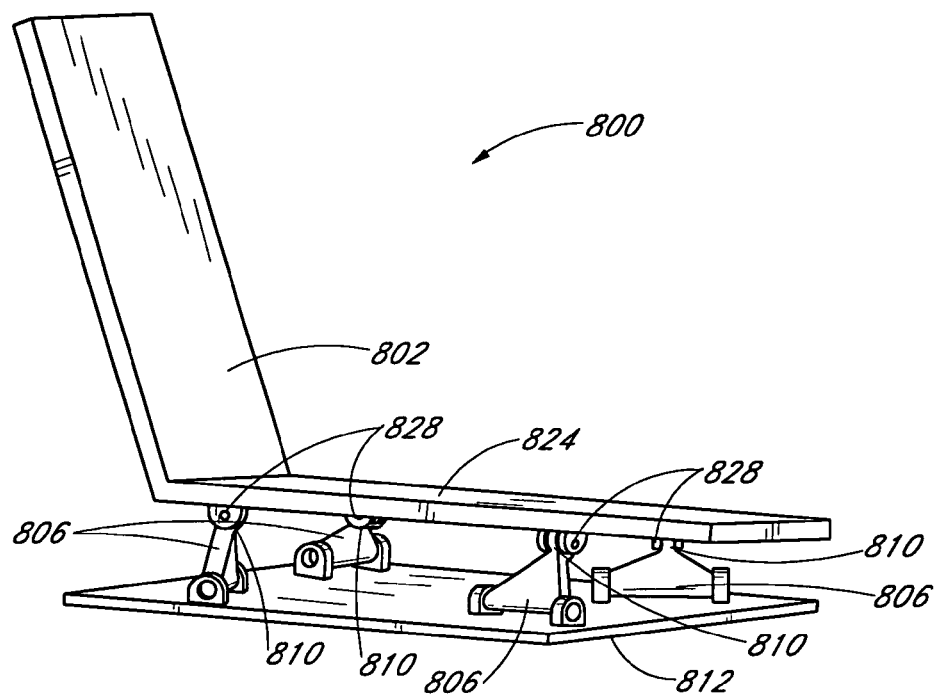
FIG. 11A is a perspective view of the vehicle seat assembly of FIG. 8 in an elevated and rotated position.
Figure 11B:
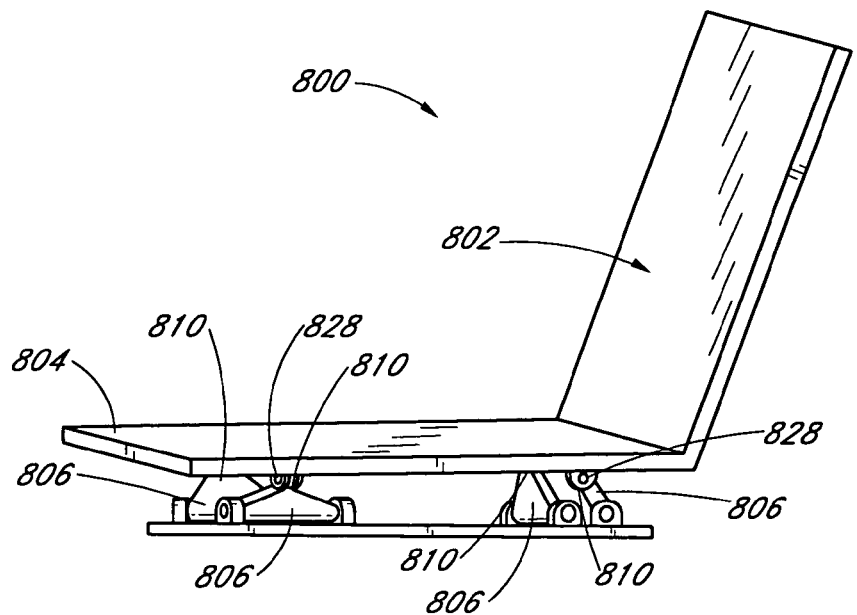
FIG. 11B is a side view of the vehicle seat assembly of FIG. 8 in an elevated and rotated position.
Figure 11C:
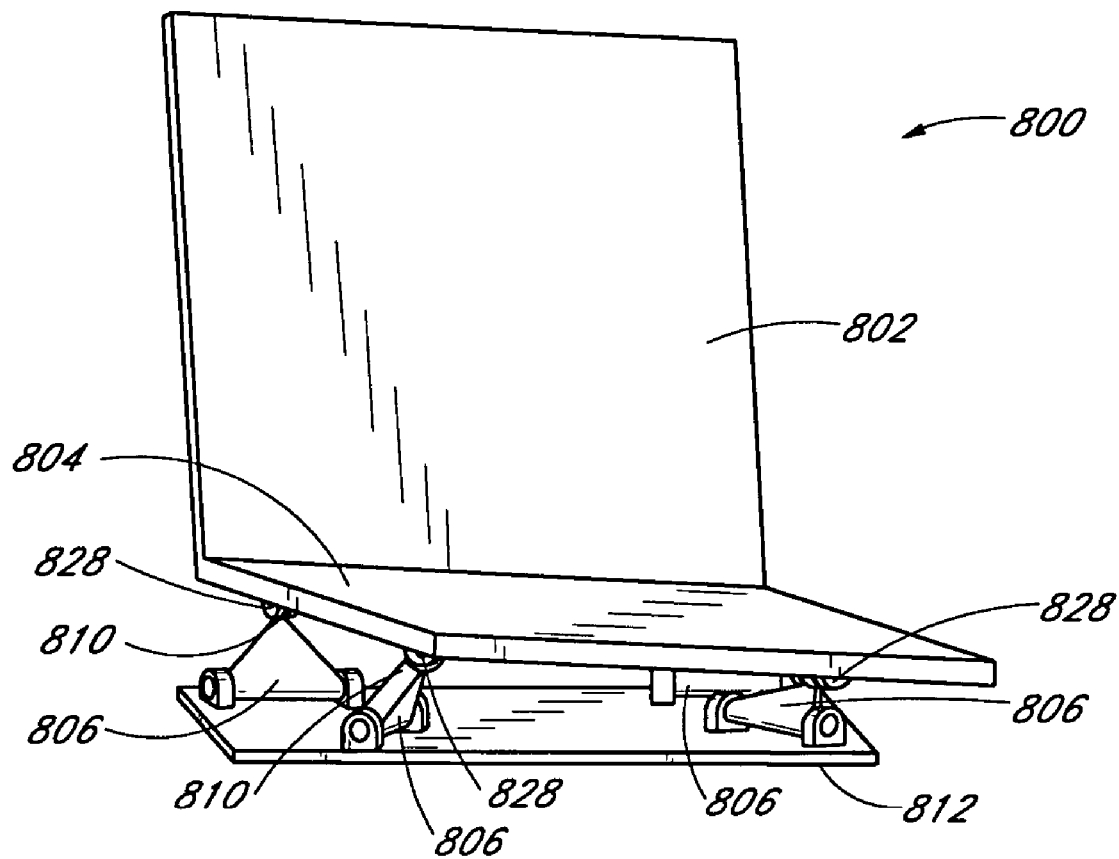
FIG. 11C is a front view of the vehicle seat assembly of FIG. 8 in an elevated and rotated position.

Certain embodiments of the seat assembly include a pivotal connection between the seat 802, the vehicle floor 812, and four links 806. FIGS. 8-11 depict illustrative four-link embodiments. With the exception of a fourth link 806, the structure and operation of the four-link embodiments of the seat assembly 800 are substantially identical to those of the three-link embodiments of the seat assembly 100 (FIGS. 1-2) as described above. FIG. 8 (perspective view), FIG. 9 (side view), and FIG. 10 (front view) illustrate a four-link embodiment of a seat assembly 800 in a first position in which the links 806 are substantially parallel to the vehicle floor 812 and the seat surface 804. FIGS. 11A (perspective view), 11B (side view), and 11C (front view) illustrate a four-link embodiment of a seat assembly 800 that has been moved towards the second position in which the links 806 are transverse to the vehicle floor 812 and the seating surface 804. As with the three-link embodiments, links 806 are pivotally mounted with respect to the vehicle floor 812 such that they define axes of rotation that converge at a central area, desirably a central area having a surface area of 64 square inches, more desirably a central area having a surface area of 4 square inches, and preferably the central area is substantially a single point, underneath the seating surface 804.

Four-link embodiments of the seat assembly 800 may be actuated to move between the first position and the second position to assist ingress and egress of the seat. At least one motor 840, 842 (FIG. 10B), such as an electric motor or a hydraulic actuator, may drive at least one link 806 to move the seat 802 from the first position to the second position. FIG. 10B depicts a schematic representation of two motors 840, 842 coupled to two links 806 via respective output shafts 844, 846. The movement of the seat 802 from the first to the second positions causes the seat surface 804 to elevate and rotate.

Although FIGS. 8-11 depict spherical bearings 828 pivotally connecting the second ends 810 of the links 806 to the seating surface 804, other couplings known in the art may alternately be used. For example double hinges 128 such as are illustrated in FIGS. 1-2 may be used in the four-link embodiments illustrated in FIGS. 8-11.

Figure 12:
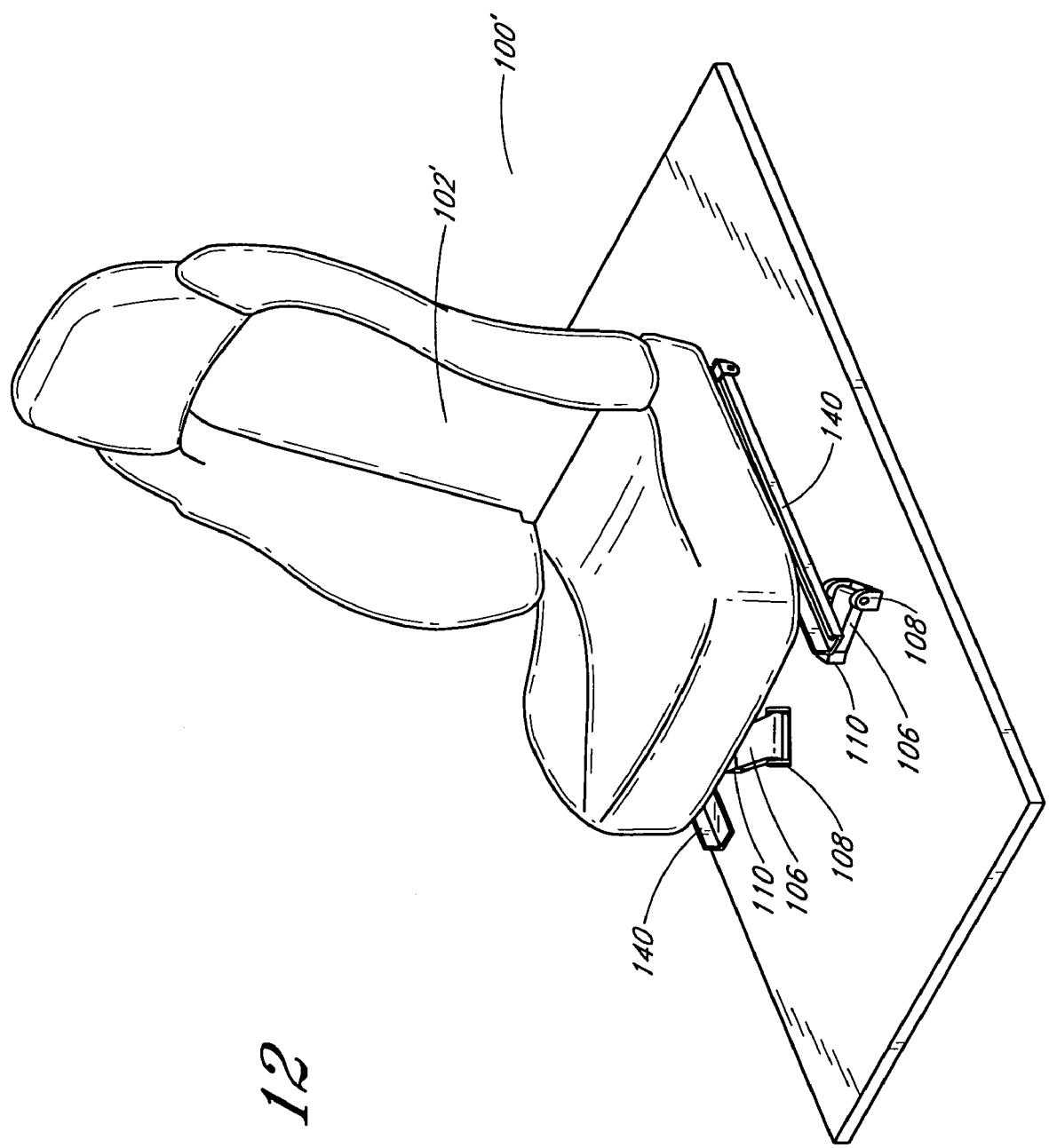
FIG. 12 is a perspective view of a vehicle seat assembly in a lowered position.
Figure 13:
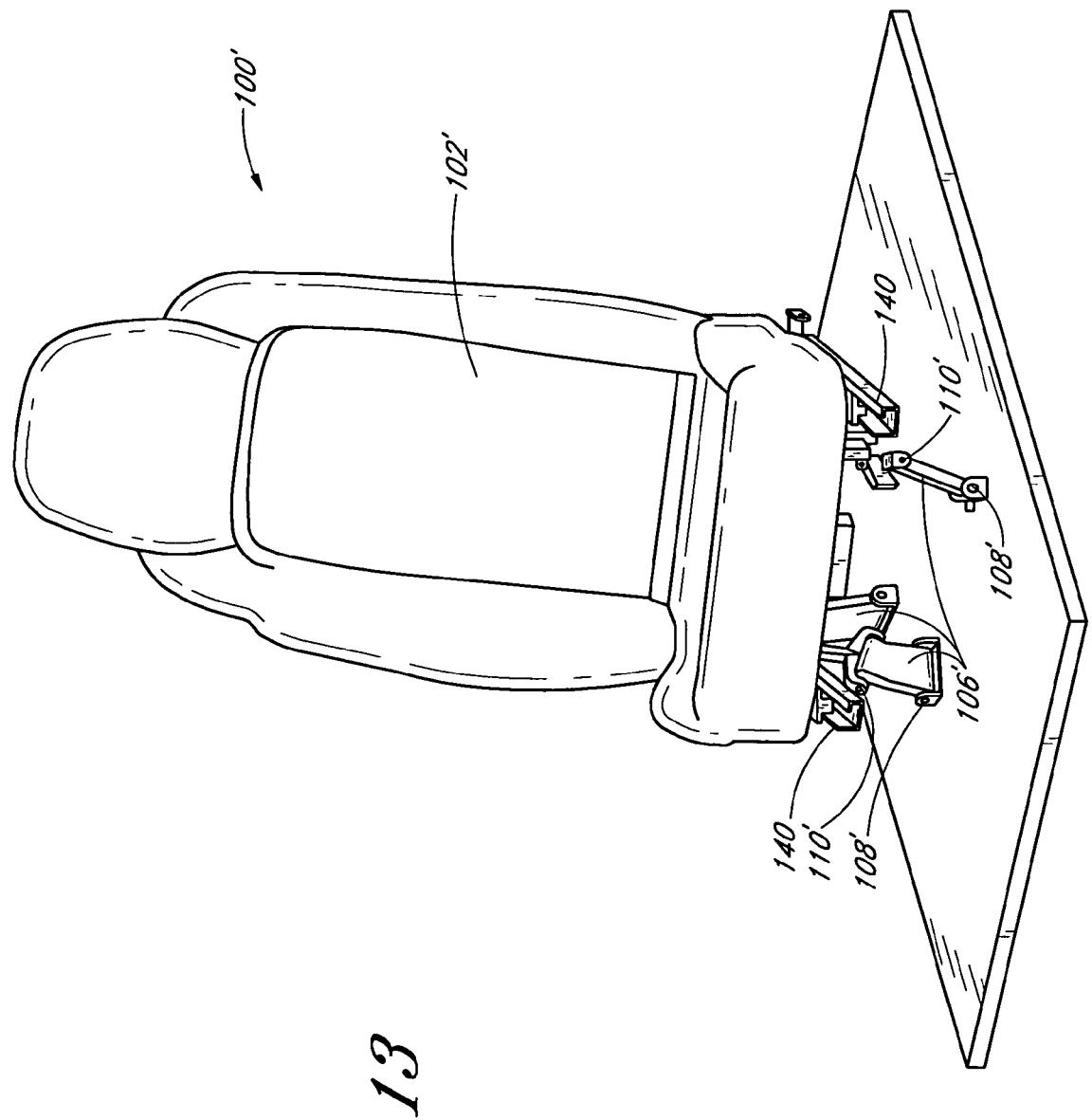
FIG. 13 is a perspective view of the vehicle seat assembly in an elevated and rotated position.

With reference to FIGS. 12 and 13 another embodiment of vehicle seat assembly 100' is depicted. The vehicle seat assembly 100' is structurally and functionally similar to the embodiment described above with respect to FIGS. 1-7. As depicted in FIGS. 12 and 13, the vehicle seat assembly 100' comprises a bucket seat 102' as can be used in an automobile. The vehicle seat assembly 100' comprises a seat 102' having a seating surface 104'; and a plurality of links 106', each link having a first portion desirably defining first end 108' and a second portion desirably defining a second end 110'. The seat 102' can be mounted on a pair of rails 140 such that it can be slid forwards and rearwards with respect to the floor of the vehicle such that a vehicle occupant's position can be easily adjusted. The second ends 110' of the links 106' can be coupled to the rails 140, coupled to frame members connected to the rails 140, or coupled to a seat base plate joined to the rails to allow forward and rearward adjustability of the seat 102' as well as elevation and rotation for ease of ingress and egress.

Method of Elevating and Rotating a Vehicle Seat Assembly

Another aspect of the seat assemblies of the present invention is a method of elevating and rotating a vehicle seat. The method includes the steps of providing a seat assembly comprising a seat having a seating surface wherein the seat is pivotally mounted with respect to a floor of a vehicle with a plurality of links having a first portion desirably defining first end and a second portion desirably defining a second end, wherein the first ends of each of the plurality of links are pivotally mounted with respect to the floor of the vehicle and the second ends of each of the plurality of links are pivotally coupled to a lower surface of the seating surface; and driving at least one of the plurality of links from a first position in which the at least one driven link is substantially parallel to the floor of the vehicle and the seating surface towards a second position in which the at least one driven link is transverse to the floor of the vehicle and the seating surface. The driving step may be accomplished with at least one motor such as an electric motor or hydraulic actuator. Where the provided seat assembly comprises three pivoting links, driving a single link between the first and second positions will elevate and rotate the seat with respect to the floor of the vehicle. Where the provided seat assembly comprises four or more pivoting links, the driving step may comprise driving more than one link to elevate and rotate the seat with respect to the floor of the vehicle.

Method of Exiting A Vehicle Seat

Yet another aspect of the seat assemblies of the present invention is a method of exiting a vehicle seat. The method includes the steps of actuating a seat assembly comprising a seat having a seating surface wherein the seat is pivotally mounted with respect to a floor of a vehicle with a plurality of links having a first end and a second end, wherein the first ends of each of the plurality of links are pivotally mounted with respect to the floor of the vehicle and the second ends of each of the plurality of links are pivotally coupled to a lower surface of the seating surface; and standing up off of the seat. Advantageously, this method facilitates exit of a vehicle by a passenger as the passenger will be elevated and rotated towards the vehicle's door. This method particularly eases the difficulties associated with exiting a small, low car such as a sports car.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Further, the various features of this invention can be used alone, or in combination with other features of this invention other than as expressly described above. Thus, it is intended that the scope of the present invention herein disclosed should not be limited by the particular disclosed embodiments described above, but should be determined only by a fair reading of the claims that follow.

What is claimed is:

1. A seat assembly comprising:
a seat having a seating surface; and
a plurality of links, each link having a first portion and a second portion;
wherein the first portion of each link is configured to be pivotally mounted with respect to a floor of a vehicle and wherein the second portion of each link is pivotally connected to a lower surface of the seating surface;
wherein the pivotal mounting of the first portion of each link defines an axis of rotation for each link; and
wherein the axes of rotation of every link of the plurality of links intersect at a central area beneath said seat when said seat is in a relaxed position.

2. The seat assembly of claim 1, further comprising a base section, wherein the first portion of each link is pivotally mounted to the base section.

3. The seat assembly of claim 2, wherein the base section is slidably mounted to the floor of the vehicle.

4. The seat assembly of claim 1, wherein the axes of rotation of every link of the plurality of links intersect at substantially a single point beneath said seat when said seat is in a relaxed position.

5. The seat assembly of claim 1, wherein the central area has an area of approximately 64 square inches.

6. The seat assembly of claim 1, wherein the central area has an area of approximately 4 square inches.

7. The seat assembly of claim 1, wherein the plurality of links comprises three links.

8. The seat assembly of claim 1, wherein the plurality of links comprises four links.

9. The seat assembly of claim 1, further comprising spherical bearings to pivotally couple the second ends of each link to the lower surface of the seating surface.

10. The seat assembly of claim 2, wherein the base section is configured to removably mount to a vehicle.

11. The seat assembly of claim 1, wherein the seat assembly is movable between a first position in which the plurality of links are substantially parallel to the floor of the vehicle and the seating surface and a second position in which the plurality of links are transverse to the floor of the vehicle and the seating surface such that when the seating assembly is moved between the first and second positions, the seat is elevated and rotated with respect to the floor of the vehicle.

12. The seat assembly of claim 1, further comprising an electric motor operatively coupled to one of the plurality of links and configured to move the seat assembly.

13. The seat assembly of claim 1, further comprising two electric motors each operatively coupled to a different one of the plurality of links and configured to move the seat assembly.

14. The seat assembly of claim 1, further comprising a telescoping ball joint positioned at approximately the central area of the seat.

15. A seat assembly comprising:
a seat having a seating surface; and
a plurality of links, each link having a first portion and a second portion;
wherein the first portion of each link is configured to be pivotally mounted with respect to a floor of a vehicle and wherein the second portion of each link is pivotally connected to a lower surface of the seating surface;

wherein the pivoted mounting of the first portion and the second portion of each link defines a pair of axes of rotation for each link; and wherein the seat assembly is movable between a first position in which the axes of rotation for each of the plurality of links are substantially parallel to the floor of the vehicle and the seating surface and a second position in which axes of rotation for each of the plurality of links are transverse to the floor of the vehicle and the seating surface such that when the seating assembly is moved between the first and second positions, the links cooperate to elevate and rotate the seat with respect to the floor of the vehicle.

16. The seat assembly of claim 15, further comprising a base section, wherein the first ends of each link are pivotally mounted to the base section.

17. The seat assembly of claim 16, wherein the base section is slidably mounted to the floor of the vehicle.

18. The seat assembly of claim 15, further comprising an electric motor operatively coupled to one of the plurality of links and configured to move the seat assembly between the first position and the second position.

19. The seat assembly of claim 15, further comprising two electric motors, each operatively coupled to a different one of the plurality of links and configured to move the seat assembly between the first position and the second position.

20. A vehicle seat assembly comprising:
    a seat; and
    a single rotating linkage mechanism providing both elevation and rotation of the seat relative to a vehicle floor.

21. A method of elevating and rotating a vehicle seat comprising the steps of:
    providing a seat assembly comprising a seat having a seating surface wherein the seat is pivotally mounted with respect to a floor of a vehicle with a plurality of links having a first portion and a second portion, wherein the first portion of each of the plurality of links is pivotally mounted with respect to the floor of the vehicle and the second portion of each of the plurality of links is pivotally connected to a lower surface of the seating surface; and driving at least one of the plurality of links from a first position in which the at least one driven link is substantially parallel to the floor of the vehicle and the seating surface towards a second position in which the at least one driven link is transverse to the floor of the vehicle and the seating surface.

22. The method of claim 21, wherein the driving step comprises the step of actuating an electric motor operatively coupled to one of the plurality of links.

23. A method of exiting a seat of a vehicle comprising the steps of:
    actuating a seat assembly comprising a seat having a seating surface wherein the seat is pivotally mounted with respect to a floor of a vehicle with a plurality of links having a first portion and a second portion, wherein the first portion of each of the plurality of links is pivotally mounted with respect to the floor of the vehicle and the second portion of each of the plurality of links is pivotally connected to a lower surface of the seating surface; and
    standing up off of the seat;
    wherein said actuating step includes the step of moving the plurality of links from a first position in which the links are substantially parallel to the floor of the vehicle toward a second position in which the links are transverse to the floor of the vehicle and the seating surface.

* * * * *

UNITED STATES PATENT AND TRADEMARK OFFICE
CERTIFICATE OF CORRECTION

PATENT NO.         : 7,506,910 B2                                Page 1 of 1
APPLICATION NO. : 11/498304
DATED                : March 24, 2009
INVENTOR(S)       : Horst Leitner et al.

It is certified that error appears in the above-identified patent and that said Letters Patent is hereby corrected as shown below:

On the title page:

(Item 73) Assignee, line 1, change "89908, Inc.," to --89908, Inc., dba AMP RESEARCH--.

At column 1, line 17, change "THE" to --THE RELATED--.

At column 2, line 50, change "plurality" to --plurality of--.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,506,910 B2  Page 1 of 1
APPLICATION NO. : 11/498304
DATED : March 24, 2009
INVENTOR(S) : Leitner et al.

It is certified that error appears in the above-identified patent and that said Letters Patent is hereby corrected as shown below:

On the Title page, under Item (75) Inventors, please change the first name of the second-listed inventor from "Bernard" to --Bernhard--.

Signed and Sealed this
Twenty-second Day of November, 2011

David J. Kappos
*Director of the United States Patent and Trademark Office*